US007966915B2

(12) United States Patent
Chen

(10) Patent No.: US 7,966,915 B2
(45) Date of Patent: Jun. 28, 2011

(54) EXTENSIVE DEVICE FOR TOOL

(76) Inventor: Hui-Chien Chen, Dali (TW)

( * ) Notice: Subject to any disclaimer, the term of this patent is extended or adjusted under 35 U.S.C. 154(b) by 415 days.

(21) Appl. No.: 12/126,968

(22) Filed: May 26, 2008

(65) Prior Publication Data

US 2009/0288523 A1 Nov. 26, 2009

(51) Int. Cl.

| | |
|---|---|
| ***B25B 23/16*** | (2006.01) |
| ***B25B 13/00*** | (2006.01) |
| ***B25B 23/00*** | (2006.01) |
| ***B25G 1/00*** | (2006.01) |
| ***F16D 3/00*** | (2006.01) |

(52) U.S. Cl. ....... 81/177.75; 81/124.5; 81/450; 464/151

(58) Field of Classification Search ............... 81/177.75, 81/124.5, 450; 464/151, 106, 158, 159; 403/57, 403/74

See application file for complete search history.

(56) References Cited

U.S. PATENT DOCUMENTS

| | | | | |
|---|---|---|---|---|
| 1,487,295 | A * | 3/1924 | Trowbridge | 81/177.75 |
| 2,436,336 | A * | 2/1948 | Slater | 403/58 |
| 3,855,884 | A * | 12/1974 | McPeak | 81/177.75 |
| 3,982,840 | A * | 9/1976 | Grosseau | 403/14 |
| 5,069,569 | A * | 12/1991 | Lieser | 403/57 |
| 6,145,416 | A * | 11/2000 | Bonniot | 81/177.75 |

* cited by examiner

*Primary Examiner* — Bryan R Muller

(57) ABSTRACT

An extensive device is disclosed to connect a bit to a handle of a tool. The extensive device includes a rod, a polygonal sphere, a socket and a retaining element. The polygonal sphere is connected to the rod near an end. The socket includes a polygonal cavity, a tunnel and a groove. The polygonal cavity receives the polygonal sphere so that the surface of the polygonal sphere is in contact with the wall of the polygonal cavity. The rod and the socket are coaxial when the end of the rod is disposed in the tunnel. The rod can be pivoted relative to the socket when the end of the rod is located outside the tunnel. The groove is defined in the wall of the polygonal cavity. The restraining element is fit in the groove of the socket to keep the polygonal sphere in the polygonal cavity of the socket.

5 Claims, 7 Drawing Sheets

EXTENSIVE DEVICE FOR TOOL

FIELD OF INVENTION

The present invention relates to a tool kit including a handle and a set of bits and, more particularly, to a duo-mode extensive device for connecting such a handle to such a bit.

BACKGROUND OF INVENTION

A tool kit including a handle and a set of bits is often seen. The handle is connected to a selected one of the bits in use. Such a tool kit may additionally include a universal joint or extensive rod for connecting the handle to the selected bit. Such a universal joint renders it possible to use the tool kit in crooked space; it is however not useful in deep and narrow space. Such an extensive rod renders it possible to use the tool kit in deep and narrow space; it is however not useful in crooked space. Therefore, a user has no choice but buying a universal joint and an extensive rod, and this is expensive. Moreover, it is troublesome to switch between the universal joint and the extensive rod.

The present invention is therefore intended to obviate or at least alleviate the problems encountered in prior art.

SUMMARY OF INVENTION

It is the primary objective of the present invention to provide an extensive device for connecting a handle to a bit of a tool kit.

To achieve the foregoing objective, the extensive device includes a rod, a polygonal sphere, a socket and a retaining element. The rod includes a first end and a second end. The polygonal sphere is disposed on the rod near the second end. The socket is formed with a polygonal cavity, a tunnel, and a groove. The polygonal cavity receives the polygonal sphere so that the surface of the polygonal sphere is in contact with the wall of the polygonal cavity. The rod and the socket are coaxial when the second end of the rod is received in the tunnel. The rod can be pivoted relative to the socket when the second end of the rod is removed axially from the tunnel. The groove is defined in the wall of the polygonal cavity. The restraining element is fit in the groove of the socket to keep the polygonal sphere in the polygonal cavity of the socket.

Other objectives, advantages and features of the present invention will be apparent from the following description referring to the attached drawings.

BRIEF DESCRIPTION OF DRAWINGS

The present invention will be described via the detailed illustration of several embodiments referring to the drawings.

DETAILED DESCRIPTION OF EMBODIMENTS

Figure 1:
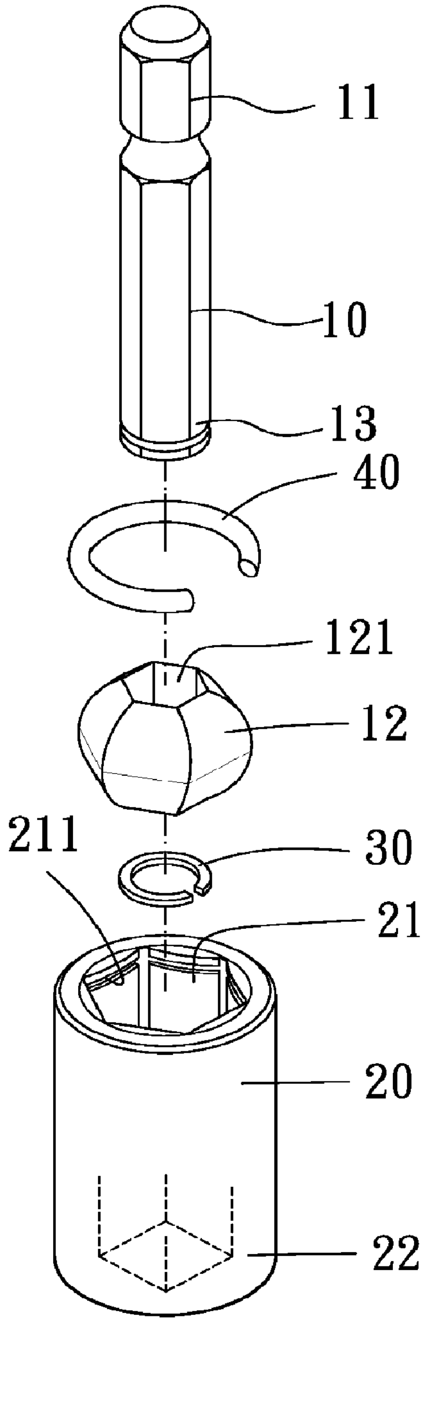
FIG. 1 is an exploded view of an extensive device according to the first embodiment of the present invention.
Figure 2:
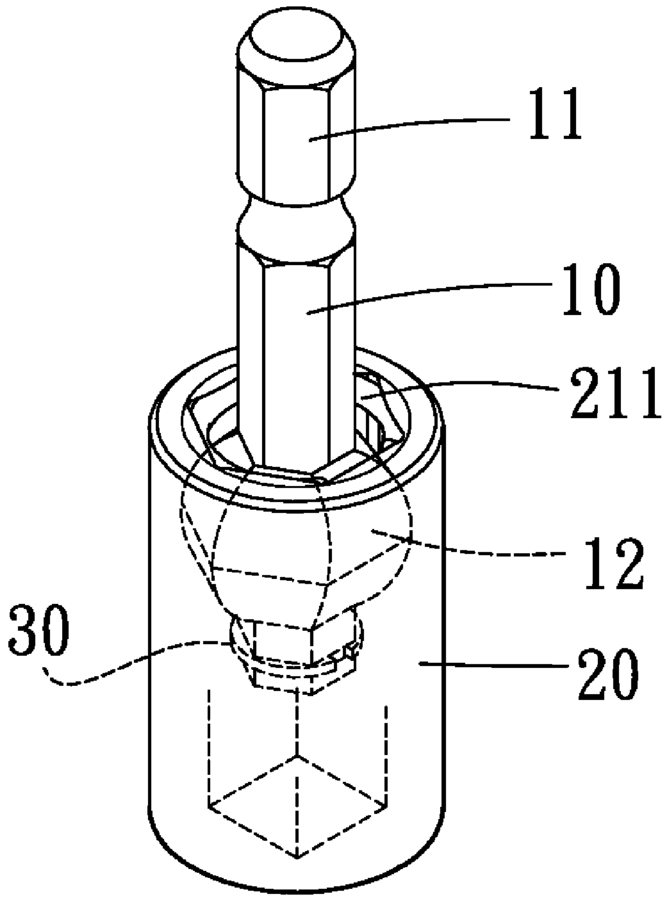
FIG. 2 is a perspective view of the extensive device shown in FIG. 1.

Referring to FIGS. 1 and 2, there is shown an extensive device according to a first embodiment of the present invention. The extensive device can be used to connect a bit to a handle of a tool kit.

The extensive device includes a rod 10, a sphere 12 and a socket 20. The rod 10 includes a first end 11, a second end 13 opposite to the first end 11 and a groove 14 near the second end 13. The rod 10 preferably includes a hexagonal periphery; however, it may include any other polygonal periphery.

The sphere 12 includes a tunnel 121 for receiving the rod 10 movably. The sphere 12 is kept on the rod 10 with a C-clip 30 fit in the groove 14. The C-clip 30 may be replaced with any other proper restraining element such as a screw while the groove 14 may be replaced with a screw hole. The wall of the tunnel 121 is shaped corresponding to the polygonal periphery of the rod 10 so that the sphere 12 is not rotational relative to the rod 10. The sphere 12 preferably includes six facets corresponding to the hexagonal periphery of the rod 10; however, it may include any other number of facets.

Figure 4:
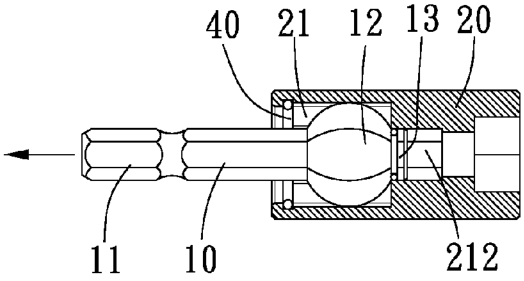
FIG. 4 is a cross-sectional view of the extensive device in another position than shown in FIG. 3.

Referring to FIG. 4, the socket 20 is formed with a first cavity 21 defined therein for receiving the sphere 12, a second cavity 22 defined therein opposite to the first cavity 21, a groove 211 defined in the wall of the first cavity 21, and a tunnel 212 for communicating the first cavity 21 with the second cavity 22. The sphere 12 is retained in the first cavity 21 with a C-clip 40 fit in the groove 211. The C-clip 40 may be replaced with any other proper restraining element such as a screw while the groove 211 may be replaced with a screw hole. The wall of the first cavity 21 is shaped compliant to the surface of the sphere 12. That is, the wall of the first cavity 21 also preferably includes six facets; however, it may include any other number of facets corresponding to the surface of the sphere 12. The facets of the wall of the first cavity 21 are in contact with the facets of the surface of the sphere 12 so that the socket 20 is not rotational relative to the sphere 12.

Figure 3:
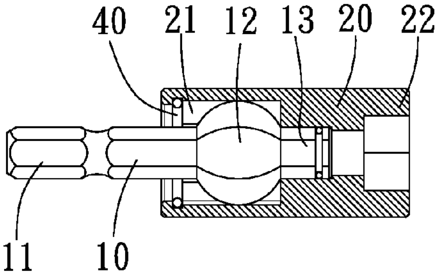
FIG. 3 is a cross-sectional view of the extensive device of FIG. 1.
Figure 5:
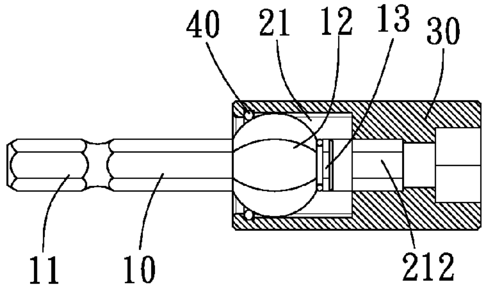
FIG. 5 is a cross-sectional view of the extensive device in another position than shown in FIG. 4.
Figure 6:
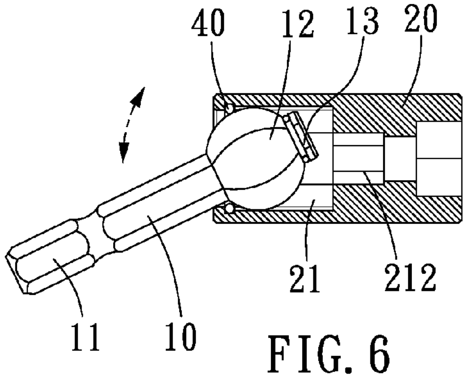
FIG. 6 is a cross-sectional view of the extensive device in another position than shown in FIG. 5.
Figure 7:
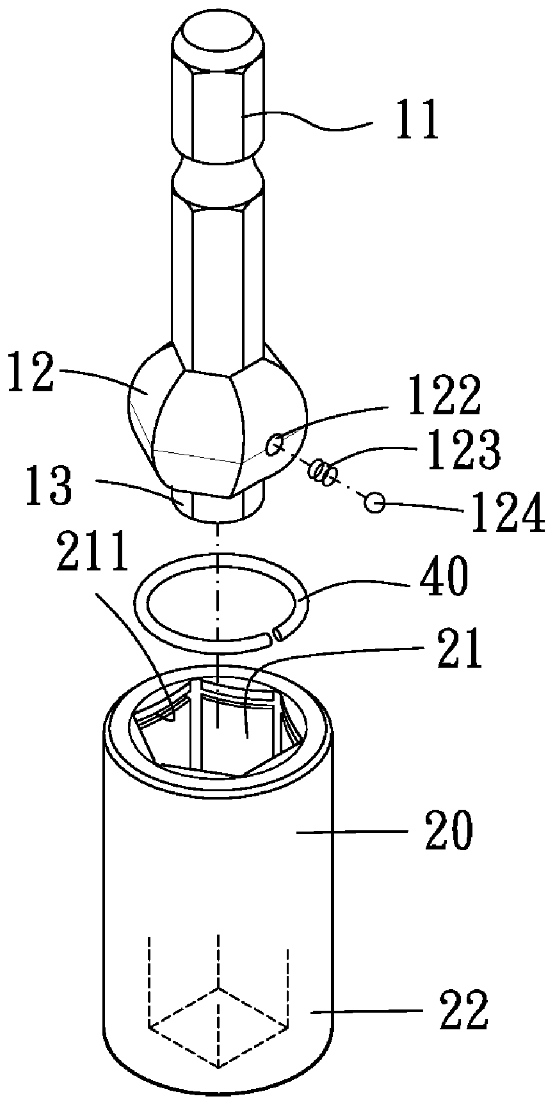
FIG. 7 is an exploded view of an extensive device according to the second embodiment of the present invention.
Figure 8:
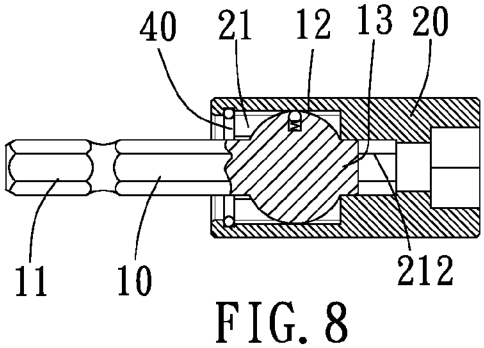
FIG. 8 is a cross-sectional view of the extensive device of FIG. 7.
Figure 9:
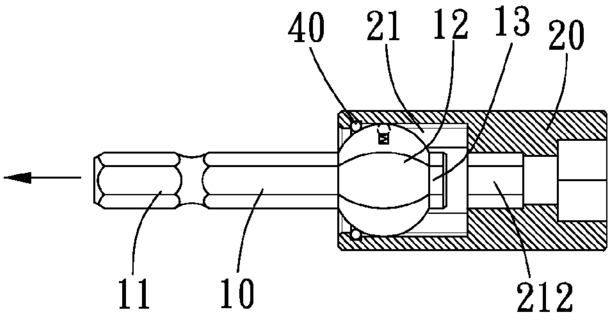
FIG. 9 is a cross-sectional view of the extensive device in another position than shown in FIG. 8.
Figure 10:
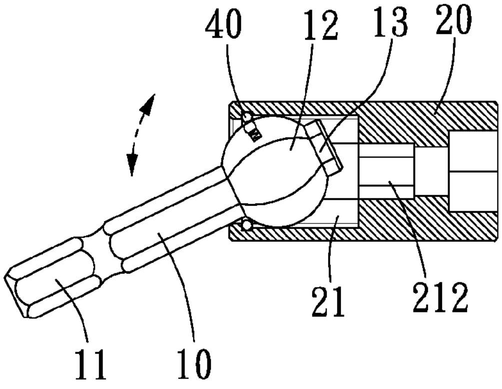
FIG. 10 is a cross-sectional view of the extensive device in another position than shown in FIG. 9.

Referring to FIG. 3 to FIG. 5, the rod 10 is able to move axially between a first position and a second position with respect to the socket 20. Referring to FIG. 3, when the rod 10 is located at the first position, the second end 13 of the rod 10 is received in the tunnel 212 of the socket 20 so that the rod 10 and the socket 20 are coaxial. The C-clip 30 may be received in the tunnel 212 and abut against the socket 20 and the rod 10. Accordingly, the sphere 12 and the socket 20 are coaxial. The sphere 12 is disposed in the first cavity 21 of the socket 20 so that the surface of the sphere 12 is in contact with the wall of the first cavity 21 of the socket 20. As the first end 11 of the rod 10 is rotated, the socket 20 is rotated coaxially. In this mode, the extensive device is used as an extensive rod.

Referring to FIG. 4, the rod 10 is moved axially relative to the socket 20. Referring to FIG. 5, when the rod 10 is located at the second position, the second end 13 of the rod 10 is divided from the tunnel 212 of the socket 20 while the sphere 12 is still disposed in the first cavity 21. Referring to FIG. 5, the rod 10 is pivoted relative to the socket 20 so that the rod 10 and the socket 20 are not coaxial. When the first end 11 of the rod 10 is rotated, the socket 22 is rotated obliquely. In this mode, the extensive device is used as a universal joint.

Referring to FIGS. 7 through 10, there is shown an extensive device according to a second embodiment of the present invention. The second embodiment is like the first embodiment except two things. Firstly, the rod 10 and the sphere 12 are made as one. Secondly, an elastic element 123 and a ball 124 are disposed in a bore 122 defined in one of the facets of the surface of the sphere 12. The elastic element 123 and the ball 124 are used to achieve firm contact of the surface of the sphere 12 with the wall of the first cavity 21 regardless of the angle between the axis of the rod 10 and the axis of the socket 20. The elastic element 123, the ball 124 and the bore 122 may be used in the first embodiment.

Figure 11:
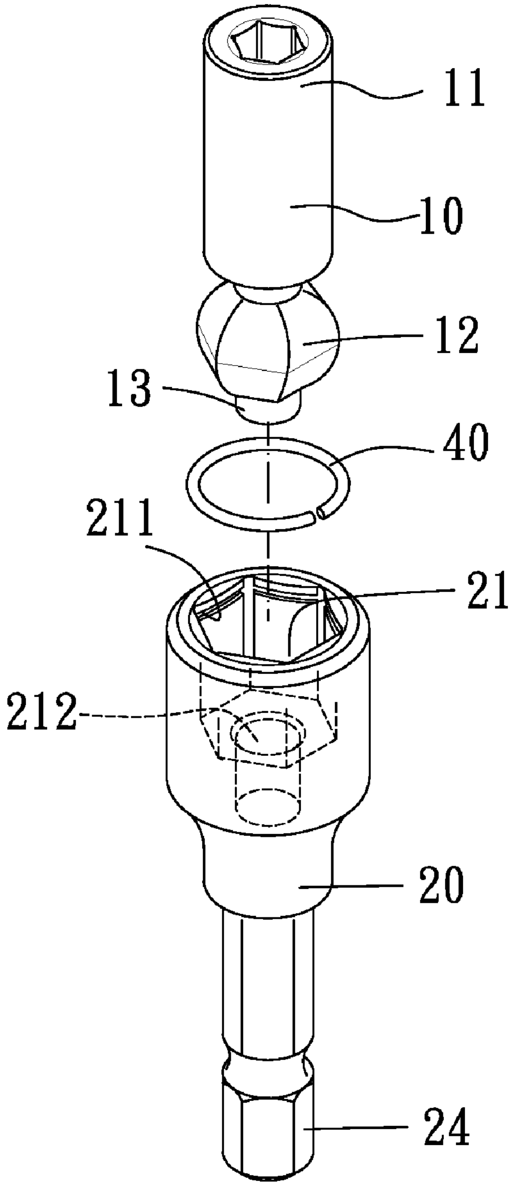
FIG. 11 is an exploded view of an extensive device according to the third embodiment of the present invention.

Referring to FIG. 11, there is shown an extensive device according to a third embodiment of the present invention. The third embodiment is like the first embodiment except several things. Firstly, the first end 11 of the rod 10 is hollow instead of solid. That is, the rod 10 is shaped like a socket. Secondly, the sphere 12 and the rod 10 are made as one. Thirdly, the socket 20 includes a polygonal insert 24 instead of the second cavity 22.

Figure 12:
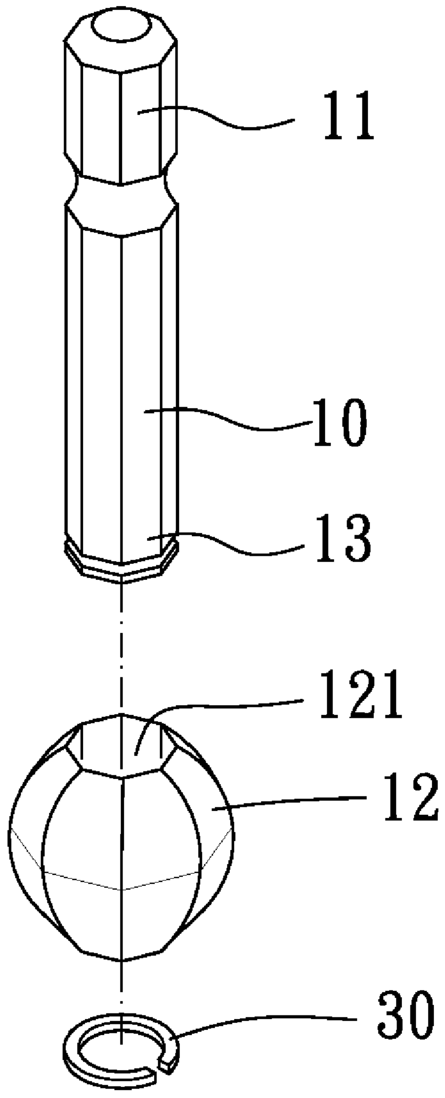
FIG. 12 is a partial exploded view of an extensive device according to the fourth embodiment of the present invention.

Referring to FIG. 12, there is shown an extensive device according to a fourth embodiment of the present invention. The fourth embodiment is like the first embodiment except several things. Firstly, the periphery of the rod 11 is octagonal, and the wall of the tunnel 121 of the sphere 12 is octagonal corresponding to the periphery of the rod 11. Secondly, the surface of the sphere 12 is includes eight facets. Although not shown, the wall of the first cavity 21 of the socket 20 includes eight facets corresponding to the surface of the sphere 12.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. An extensive device comprising:

a rod comprising a first end and a second end;

a polygonal sphere comprising a first tunnel for receiving the rod therethrough, disposed on the rod near the second end and retained on the rod with a first restraining element;

a socket being formed with:

a polygonal cavity for receiving the polygonal sphere so that the wall of the polygonal cavity is in contact with the surface of the polygonal sphere;

a second tunnel for receiving the second end of the rod; and a groove defined in the wall of the polygonal cavity; and a second restraining element fit in the groove of the socket to retain the polygonal sphere in the polygonal cavity of the socket;

wherein the rod is able to move axially between a first position and a second position with respect to the socket and the polygonal sphere;

wherein when the rod is located at the first position, the second end and the first restraining element are received in the second tunnel and the rod and the socket are coaxial; and wherein when the rod is located at the second position, the second end is spaced from the second tunnel and the rod is adapted for pivoting with respect to the socket.

2. The extensive device according to claim 1, wherein the second end of the rod is polygonal.

3. The extensive device according to claim 1, wherein the socket comprises another cavity opposite to the polygonal cavity.

4. The extensive device according to claim 1, wherein the first restraining element is a C-clip.

5. The extensive device according to claim 1, wherein the second restraining element is a C-clip.

* * * * *